Dec. 7, 1943.  J. F. KENDRICK  2,336,257
METHOD AND APPARATUS FOR RELEASING JAMMED WELL-DRILLING TOOLS
Filed Jan. 9, 1942  6 Sheets-Sheet 1

Inventor
John F. Kendrick
By W. S. McDowell
Attorney

Dec. 7, 1943.   J. F. KENDRICK   2,336,257
METHOD AND APPARATUS FOR RELEASING JAMMED WELL-DRILLING TOOLS
Filed Jan. 9, 1942   6 Sheets-Sheet 2

Inventor
John F. Kendrick
By W. S. McDowell
Attorney

Dec. 7, 1943.          J. F. KENDRICK          2,336,257
METHOD AND APPARATUS FOR RELEASING JAMMED WELL-DRILLING TOOLS
Filed Jan. 9, 1942          6 Sheets-Sheet 3

Inventor
JOHN F. KENDRICK

W. S. McDowell
Attorney

Dec. 7, 1943.   J. F. KENDRICK   2,336,257
METHOD AND APPARATUS FOR RELEASING JAMMED WELL-DRILLING TOOLS
Filed Jan. 9, 1942   6 Sheets-Sheet 4

Inventor
JOHN F. KENDRICK
By W. S. McDowell
Attorney

Dec. 7, 1943.   J. F. KENDRICK   2,336,257
METHOD AND APPARATUS FOR RELEASING JAMMED WELL-DRILLING TOOLS
Filed Jan. 9, 1942   6 Sheets-Sheet 6

Inventor
JOHN F. KENDRICK

By W. S. McDowell
Attorney

Patented Dec. 7, 1943

2,336,257

UNITED STATES PATENT OFFICE 2,336,257

METHOD AND APPARATUS FOR RELEASING JAMMED WELL-DRILLING TOOLS

John F. Kendrick, Columbus, Ohio, assignor to International-Stacey Corporation, Columbus, Ohio, a corporation of Ohio Application January 9, 1942, Serial No. 426,173

18 Claims. (Cl. 254—1)

This invention relates to an improved method and apparatus for dislodging well appliances when the latter become stuck, or held against releasing movement.

For example, one of the shortcomings of the cable tool drill is that the well must be drilled to a point below a treacherous formation before any very adequate precaution can be taken. All this time, there is grave danger of the tools becoming stuck, as a result of cavings falling from above and wedging the tools against the wall of the hole. As a safety measure, it is customary to place a device known as a "jar" in the string of tools, generally directly below the socket to which the "cracker" or drilling line is attached. The usual drill stem is attached to the jar and the bit is screwed to the stem.

Such a jar ordinarily consists of a loose link. When the tools become stuck, the driller endeavors to adjust the hitch and motion of the walking beam or spudder so that this link opens and closes with a snap on each stroke of the temper screw. The effectiveness of the jar depends on the mass above the link, which is generally small compared to the mass below the link, and to the velocity of the mass above the link at the instant of impact. That the mass above the link is often inadequate is evidenced by the fact that many operators place what is known as a sinker bar between the jar and the socket. As the well gets deeper, the elasticity of the drilling cable increases and it is very difficult, even for an experienced driller, to adjust the motion of the beam or spudder to get a proper jarring action, and to determine when there is present a satisfactory jarring action. Frequently, it is impossible to keep the jars from hitting both ways. Occasionally it proves impossible to free the stuck tools with the drilling jars and sometimes the jars themselves become wedged so they cannot be operated. Then it becomes necessary to cut or otherwise part the drilling line and run in with a fishing string made up with the stem between the jars and the socket, with a suitable fishing tool at the bottom of the jar. There have been times when such a fishing string has become stuck also. During all these operations, there is serious danger of the drilling cable being whipped off or broken. All such factors combine to make all jarring operations hazardous, time consuming, and expensive.

From this brief description, it will be apparent that the present art of jarring is ineffective due to the difficulty of getting the desired jarring motion on account of the elasticity of the drilling line and due to the relatively greater mass of the devices to be freed compared to the releasing impact that can be delivered. These conditions are found not only in drilling wells with cable or standard drill, but also when these tools are used to deepen or clean out an old well. Also, when the tubing of a producing well is set in a packer, the packer sometimes sticks, resulting in a very large mass compared to any releasing impact that can be delivered. The same conditions may be encountered when it is desired to pull casing when a well is to be abandoned. Should the drill pipe of rotary drilling apparatus become stuck, there is no effective way to apply jarring action to release it. Other examples could be cited, but these will serve to give a general understanding of the problems involved.

It is an object of this invention to provide a system utilizing the elastic properties of the element which connects the stuck device with the surface of the ground, be it drilling cable, tubing, drill pipe, or casing, to transmit a longitudinal or compressive impulse from the surface to the stuck device. If jars are attached to the stuck device and are operative, such an impulse will serve to operate the jar in an effective manner. However, if no jars are present, or if they are inoperative, such an impulse will subject the stuck device to an impact closely analogous to that delivered by the usual jar when operated properly. Then the effect will be like striking the stuck element with a massive hammer, the blow being generated at the surface. Such impacts will be effected without running any other device into the well, which in turn might become stuck, and these impacts are readily controllable as to frequency and magnitude. It will be easy to start operations with a slow succession of gentle impacts, increasing the intensity until the stuck device is freed or it becomes apparent that it cannot be freed by any such means. Then, if the magnitude of the impact is further increased, the elastic element will break at the point of maximum stress, most frequently close to the stuck device. Then the usual fishing tools can be run, and when jarring action is required, they can be operated effectively by the same sort of longitudinal impulse generated at the surface. With this new jarring technique, the frequency, magnitude, and direction of the impact are all under the positive control of the operator.

The longitudinal or compressive impulse is generated at the surface by first taking an initial tension in the drilling cable, tubing, drill pipe, casing, or whatever the elastic element may be.

It is then clamped to the jarring device, which then stretches the elastic element further by raising the clamp slightly. The upward movement is then stopped and the clamp is allowed to fall freely under the influence of the contraction of the elastic element and its dead weight. This downward movement is checked suddenly by impact with a recoil device before the initial tension in the elastic element has been exhausted. This impact generates the impulse which travels the length of the elastic element to exert a jerk on the stuck device. The initial tension, the magnitude of the secondary tension imposed by the further stretching of the elastic element, and the cushion of the recoil device are factors which can be controlled or varied, thus making the impact of the jar positive in action.

For a further understanding of the invention, reference is to be had to the following description and the accompanying drawings, showing its application to the cable tool drill, wherein.

Referring more particularly to the drawings, and the form of the invention illustrated in Figs. 1 to 9, inclusive, the numeral 1 designates the well bore or opening, the same being supplied with the usual metallic tubing or casing 2. On the ground line 3, and above the well opening, there is placed the usual derrick 4 and the rotary bull wheel and drum 5. One end of the drilling cable 6 is attached to the bull wheel, and from the latter element the cable extends over the usual crown block or sheave, not shown, at the top of the derrick 4. From the crown block, the cable descends vertically and axially of the derrick, similarly passing through the tubing or casing 2, having suspended from the lower end thereof the usual percussive type drilling tools, not shown, employed in the drilling of well openings. As previously stated, it is not uncommon in the drilling of wells for the drill tools to become accidentally lodged against movement in the bottom of the well opening, and the present invention provides an improved jar, indicated generally at 7, disposed at the ground line 3, and adapted for facilitating the release of such jammed or caught tools.

Figure 1:
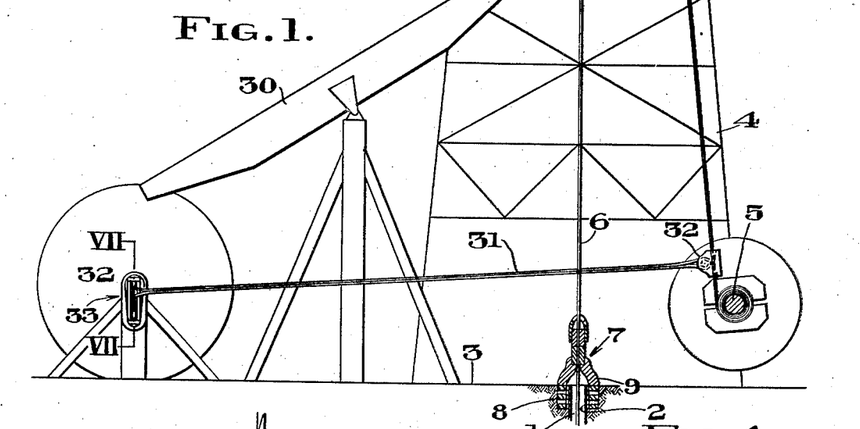
Fig. 1 is a diagrammatic view illustrating a well-drilling rig provided with the surface located jarring apparatus comprising the present invention.
Figures 2, 3, 4:
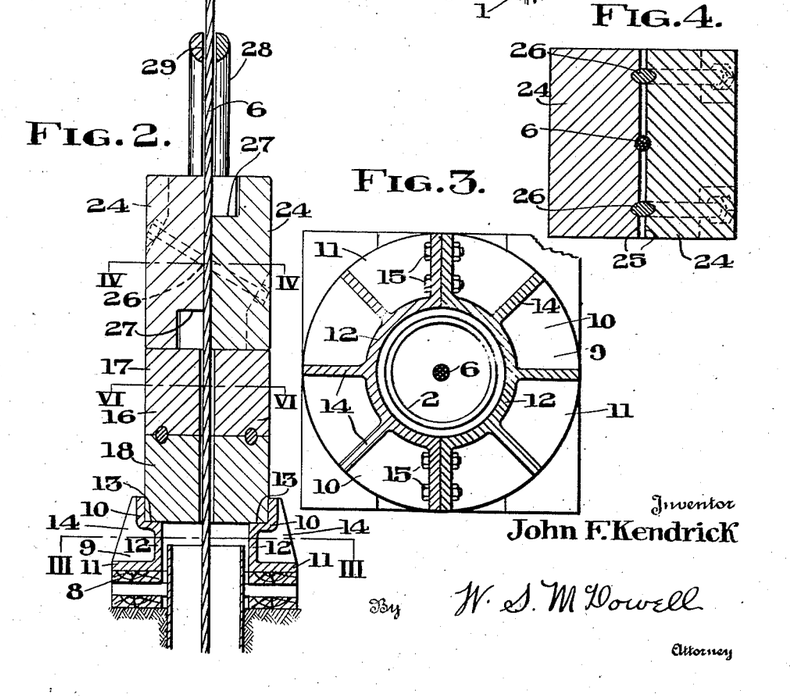
Fig. 2 is a vertical sectional view taken through the hammer and anvil members of the jarring apparatus.
Fig. 3 is a detail horizontal sectional view taken through the sectionalized crib supported base for the anvil member of the jarring apparatus on the plane indicated by the line III—III of Fig. 2.
Fig. 4 is a horizontal sectional view on the line IV—IV of Fig. 2, developing the cable clamping construction of the hammer member.

In a simple embodiment of the invention, the jar is placed on a cribbing 8, composed of crossed timbers, located around the upper end of the tubing or casing 3, as shown in Figs. 1 and 2. Placed on this cribbing is the substantially sectionalized base 9 of the jar, said base being employed to transmit the impact of the jar through the timber cribbing to the ground. The base is composed of separable sections so that it can be conveniently placed around the drilling cable, tubing or casing. As shown particularly in Figs. 2 and 3, the base, in this instance, is composed of a pair of duplicative sections 10—10, each of which includes a horizontally arranged bottom flange 11, adapted to rest on the cribbing 8 and an upstanding semicircular collar 12, the latter having formed therein a horizontal anvil seat 13. The collar 12 is united with the flange 11 and each section is reenforced by means of radially disposed ribs 14, the sections 10—10 being bolted together as at 15.

Figures 5, 6, 7, 9:
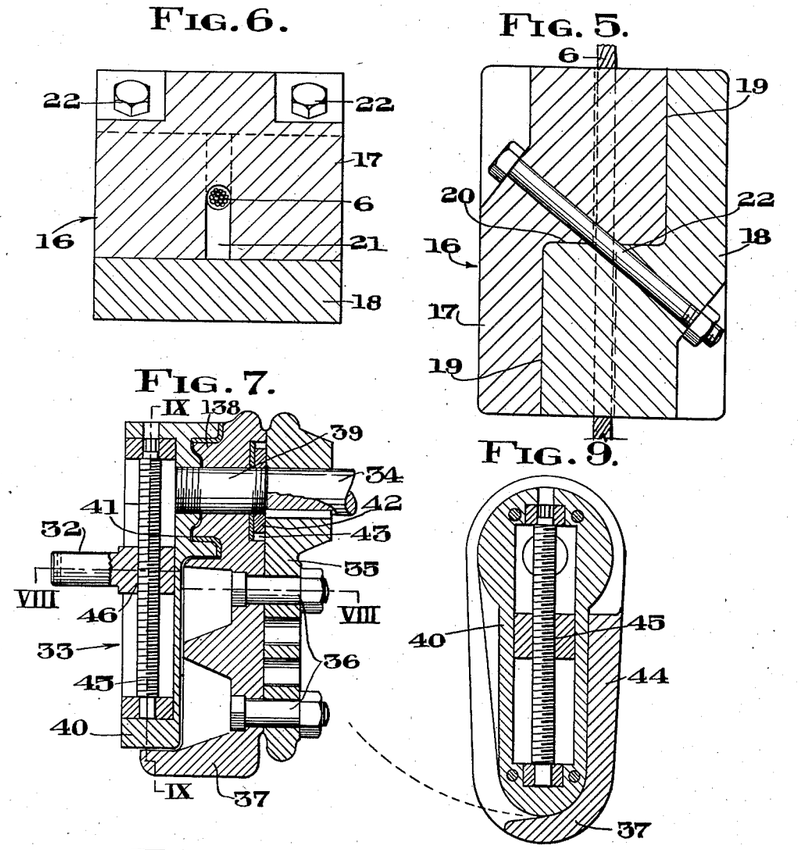
Fig. 5 is a vertical sectional view through the anvil member.
Fig. 6 is a horizontal sectional view taken through said anvil member on the plane indicated by the line VI—VI of Fig. 2.
Fig. 7 is a vertical sectional view on the line VII—VII of Fig. 1 and disclosing the crank construction for actuating the drill cable to impart movement to the hammer member of the apparatus.
Fig. 9 is a vertical sectional view on the line IX—IX of Fig. 7.

Adapted to be seated on the base 9 is an impact-receiving anvil 16. This anvil loosely receives for free movement in the center thereof the drill cable 6. Preferably, the anvil comprises a pair of separable sections 17 and 18 which may be assembled by being placed around the line 6. These sections have vertical meeting faces 19 which are offset laterally with respect to the drill line, the said faces terminating in horizontally disposed matching surfaces 20. The vertical face 19 of each of the sections 17 and 18 is provided with a slot 21 for the reception of the cable 6. Further, the sections of the anvil are secured together by means of angularly arranged bolts 22, placed on each side of the cable. As in the case of the base 9, the sectionalized construction of the anvil enables the same to be readily positioned about the cable.

The hammer 23 of the jar comprises a pair of sections 24—24 having adjoining vertical faces 25 in which shallow registering grooves are provided for the reception of the cable 6. Angularly extending clamping bolts 26 pass through the sections 24—24 in order to bring the faces 25, or the grooves thereof, into clamping engagement with the drill cable, so that the hammer will move in unison with the cable toward and away from the anvil 16. The two-part construction of the hammer enables the same to be readily clamped to the drill cable when the latter is in its operative position. The faces 25 of the sections 24 terminate in oppositely extending and vertically spaced horizontal shoulders 27, which are held in positive engagement by the angularity of the clamping bolts 26. The hammer may be provided at its upper end with bail sections 28, the latter being spaced to provide an opening 29 through which the cable 6 passes.

In the operation of the jar, following the lodging or jamming of the drill tools in the bottom of the well opening, the cable 6 is drawn taut and placed under initial tension by rotating the bull wheel 5, the cable having first been disconnected from the working head of the pivoted walking beam, shown at 30. With the cable under this initial tension, the base 9 is positioned on the cribbing 8 around the cable, this being followed by the positioning of the anvil on said base and around the cable, after the manner depicted in Figs. 1 and 2. The hammer 23 is then clamped to the cable with the lower surface of the hammer in seating contact with the upper surface of the anvil. When this arrangement of the jar members has been effected, the cable is again stretched to cause the elevation of the hammer and its separation from the anvil, and upon the completion of this second cable stretching operation, the forces so stretching the cable are suddenly released, causing the hammer to be brought into sharp impact-imparting engagement with the anvil.

Such an operation, or sequence of operations, results in generating a sharp longitudinal wave motion in the taut drilling line, which travels down to the lodged tools in the bottom of the well, subjecting such tools to a sharp jar which, in most cases, will effect their release. If the tools are moved without being completely freed, to an extent releasing the tension on the cable line, it will be necessary to unclamp the hammer, restore the desired initial tension on the cable line, then again fasten the hammer to the cable with the hammer resting on the anvil and repeat the operations. This will be continued until the drilling tools come free or, under severe conditions, the line breaks. From the nature of the operation, the breaking or parting of the cable customarily takes place close to the swivel socket to which the lower end of the cable is connected with the string of drilling tools. Such a point of parting is desirable, in that it enables the entire line to be removed, without portions thereof coiling in the bottom of the well opening, and thereby facilitates the operation of extricating the lodged drill by means of the usual fishing tools.

Various appliances may be employed for imparting the secondary stretching or tensioning forces to the cable 6 in order to elevate the hammer from the anvil of the jar. The means for accomplishing this operation, illustrated in Figs. 1 to 8, comprise a tug rope or line 31, one end of the latter being connected with a spudding shoe 32 detachably received on the dead end of the cable line 6 contiguous to the drum or bull wheel 5. The other end of the tug rope or line is connected with an adjustable wrist pin 32 carried by a crank assembly 33. As the wrist pin rotates, the dead end of the drilling line is bowed out, which transmits a reciprocatory motion to the live portion of the drilling cable. In the operation of the jar, it is necessary to have the hammer fall unobstructedly from the top of its stroke until it impacts the anvil. This indicates the desirability of a free motion device which can be attached to the standard crank of the drilling machine or rig.

Figure 8:
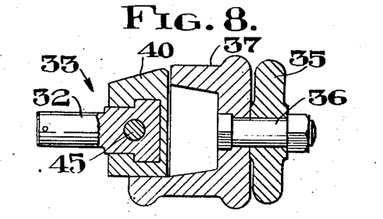
Fig. 8 is a horizontal sectional view on the plane indicated by the line VIII—VIII of Fig. 7.

Such a free motion device has been illustrated in Figs. 7, 8 and 9. In these figures, the numeral 34 designates the crank shaft of the drilling rig. To the crank shaft, there is keyed the usual crank arm 35, which forms a part of the assembly 33. Bolted as at 36 to the front of the crank arm is an auxiliary crank member 37, which rotates in unison with the shaft 34 and the arm 35. The member 37 is formed in registration with the axis of the shaft 34 with a boss 38, the latter being provided with an axial opening to receive the plain shank portion of a pivoting stud 39. This stud is threadedly carried by the axial portion of a free motion crank 40, also forming a part of the assembly 33. Around the axis of the stud 39, the inner face of the crank 40 is formed with a circular recess 41 in which is received the boss 38. The stud 39 loosely projects through the boss 38 and the inner end thereof is threaded for the reception of a securing nut 42, which is positioned in a recess 43 formed in the back of the auxiliary crank member 37.

By this construction, the crank 40 may rotate freely about its pivotal axis. However, one edge of the auxiliary crank member 37 (see Fig. 9) is provided with an integral web 44, disposed in contact with an adjacent edge portion of the crank 40 when the crank assembly rotates in a clockwise direction. During rotation of the crank assembly through the lower half of its full orbit of turning movement, the web 44 maintains contact with the crank 40 to cause its rotation in unison with the crank assembly. This results in pulling the tug rope 31 and bowing the cable 36 to impart final tensioning forces to said cable and the lifting of the jar hammer. As the crank assembly moves substantially through the upper half of its circular orbit of travel, the pull on the tug rope causes the free motion crank to turn quickly and sharply about the axis of the stud 39, thereby releasing the tension on the cable 6 and causing the hammer of the jar to deliver a sharp blow or impacting force to the anvil 16. Continued rotation of the crank assembly causes this operation to be successively repeated.

The wrist pin 32 is adjustable radially of the free motion crank by the provision of a journaled lead screw 45 carried by the crank 40. This screw is received in a threaded opening 46 formed in the slot-guided inner end of the wrist pin 32. By rotating the screw 45, the wrist pin may be caused to move longitudinally with respect to the axis of the screw 45, thereby varying the spacing of the wrist pin with respect to the axis of the stud 39 and consequently varying the extent of lifting motion of the hammer. When the tug line is released by the free motion of the crank 40, and the hammer comes into contact with the anvil 16, the cable 6 still is maintained under tensioning forces, with the result that a longitudinally directed wave-like motion is imparted to the taut cable below the hammer for applying to the lodged tools forces adapted to effect their release. These operations are repeated until the tools are released or, under certain severe conditions, until the cable 6 parts. By reason of the forces imparted to the cable through the operation of the jar, such parting of the cable takes place adjacent to the point where the lower end of the cable is fastened to the drilling tools, that is, the swiveled socket or connector. It will be appreciated that when the line so parts, it may be withdrawn in toto from the well bore, thereby enabling convenient use of fishing tools inserted in the bore for recovering or releasing the lodged tools. If desired, the jar may be used on the cable line from which the fishing tools are suspended.

The apparatus forming the present invention is subject to considerable modification without departing from its fundamental operating features. By way of example, one of such modified forms has been illustrated in Figs. 10 to 15 inclusive. In these figures, the jar, which has been indicated generally by the numeral 50, is positioned in a pit 51 formed in the ground at the top of the well bore 52. By placing the jar 50 in such a pit, the same, when not in use, will be located below the derrick flooring and, therefore, out of the way.

Figures 11, 12:
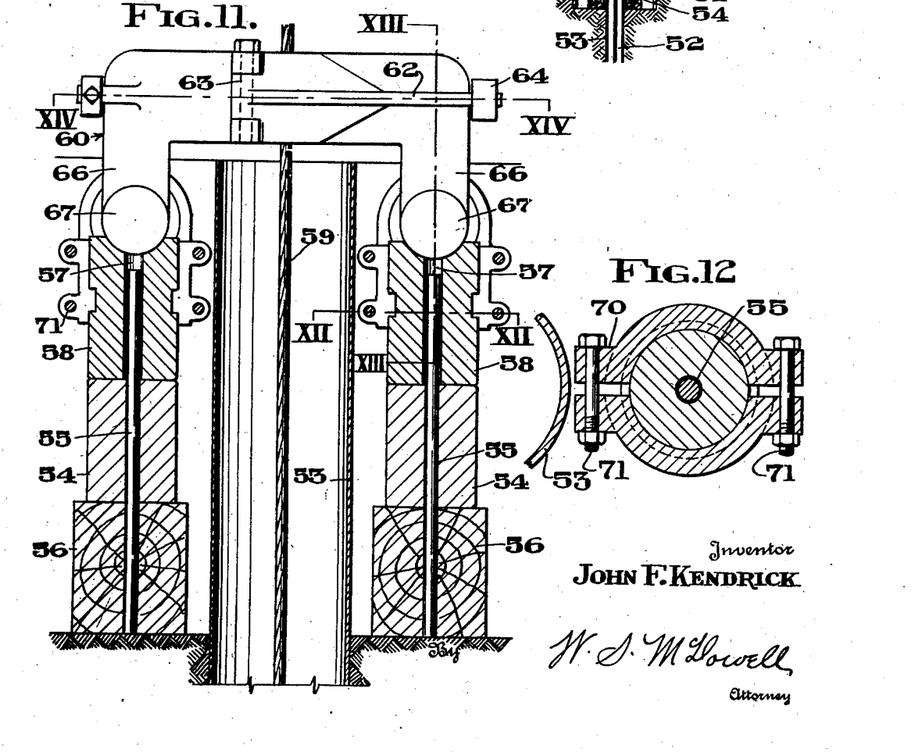
Fig. 11 is a vertical sectional view on an enlarged scale of the jar apparatus illustrated in Fig. 10.
Fig. 12 is a detail horizontal sectional view on the line XII—XII of Fig. 11.

Arranged in the pit 51, on opposite sides of the well casing or tubing 53 is a pair of anvil or impact-receiving members 54. These members are formed with axial openings for the reception of guide rods or tubes 55 which arise from spaced timbers 56 disposed in the bottom of the pit. The guide rods or tubes 55 are of sufficient height to extend loosely into axial openings 57 provided in a pair of slidable hammer or impact-imparting members 58, the latter being guided for their movement on the upper portions of the rods or tubes 55.

Figure 14:
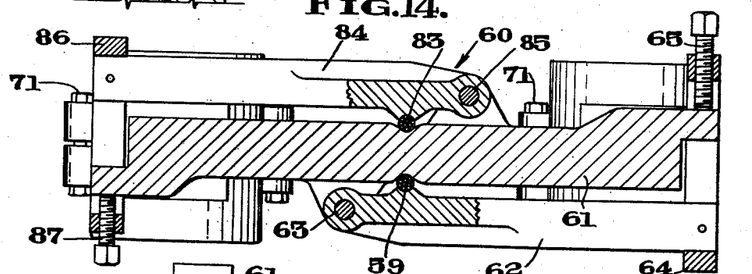
Fig. 14 is a horizontal sectional view on the plane indicated by the line XIV—XIV of Fig. 11.
Figure 15:
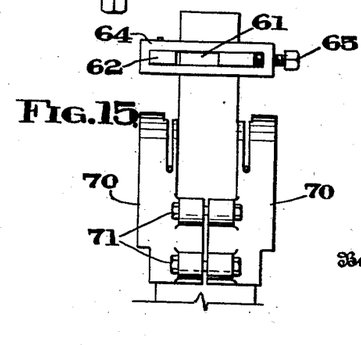
Fig. 15 is a fragmentary end elevational view of the cable yoke.

To facilitate the attachment of these hammer members to the drill cable 59, use is made of a detachable yoke 60. This yoke is formed with a centrally disposed bar 61 which, when the jar is in use, is placed against one side of the cable 59 and is firmly clamped to the latter for movement in unison therewith by means of a clamping lever shown at 62. This lever is pivoted as at 63 to the side of the bar 61 and its outer end is adapted to be received in a slotted bail 64. This bail receives one end of the bar portion 61 of the yoke and is provided with a clamping screw 65. The inner end of this screw engages with the complemental end of the bar 61 positioned in the bail, as shown in Fig. 14, so that when the screw 65 is tightened, the bail will draw the free end of the lever inwardly and clamp the yoke in secure engagement with the cable 59.

Figure 13:
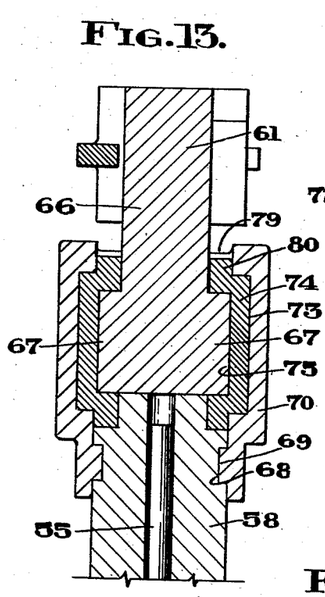
Fig. 13 is a detail vertical sectional view on the plane indicated by the line XIII—XIII of Fig. 11.
Figure 16:
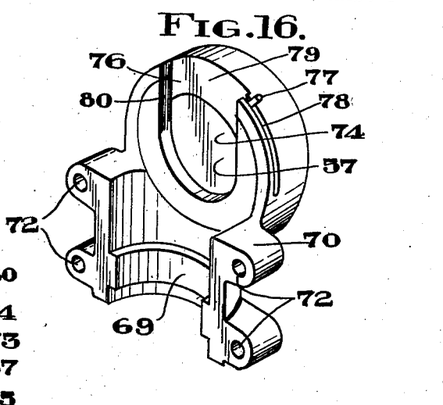
Fig. 16 is a detail perspective view of one of the yoke-carried hammer-clamping members.

Also, the outer ends of the yoke 60 terminate in downwardly directed legs 66, the lower ends of which are formed on opposite sides of said legs with circular enlargements 67. To quickly connect these enlarged portions of the yoke with the hammer members 58, the said members are provided, near their upper ends, with annular grooves 68 in their outer sides. Adapted to occupy these grooves are arcuate ribs 69 which integrally project from the inner surfaces of separable clamping members 70, a pair of such members being connected with each of the hammer members and adapted to be permanently carried thereby. Bolts 71 pass through aligned openings 72 provided in each set of clamping members in order to positively retain said members in secured connection with the impact-imparting hammers 58 by maintaining the ribs 69 seated in the grooves 68. The inner surfaces of the clamping members 70 are circularly recessed as at 73 for the rotatable reception of a plurality of swiveled retaining disks 74, the inner faces of the disks 74 being circularly recessed as at 75 for the reception of the enlargements 67 on the legs of the yoke 60. By reference to Fig. 16, it will be noted that the inner faces of the disks 74 are cut away to produce slots 76 which communicate with the recesses 75 at one side thereof. The slots 76 are of such width as to permit the enlargements 67 to pass through the same when the yoke is moved in a downward direction. Then, by partially rotating the disks 75, as by means of the finger extensions 77, which are positioned in arcuate slots 78, formed in the clamping member 70 and joined with the peripheral portions of the disks 74, the latter may be rotated so that the slots 76 will be moved out of vertical registration with the openings 79 formed at the top of each pair of clamping members 70, said openings being closed, as shown in Fig. 13, by the outwardly extending annular flanges 80 of the retaining disks. By this means, the yoke may be readily attached to or removed from supporting relation with the hammer members 58.

Figure 10:
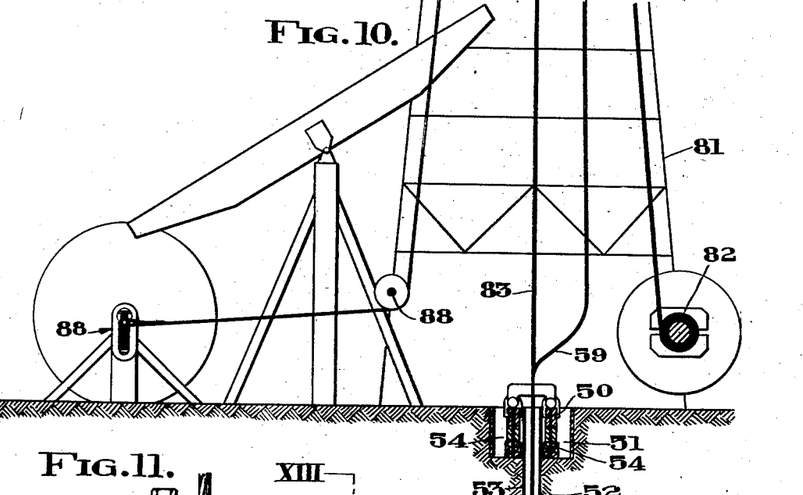
Fig. 10 is a diagrammatic side elevational view, partly in vertical section, of a modified form of jar apparatus formed in accordance with the present invention.

The drill cable 59 extends upwardly from the well bore, passing around the crown block, not shown, at the top of the derrick 81 and thence downwardly of the derrick, having the dead end thereof secured to the drum of the bull wheel 82. As in the previously described form of the invention, when the jar is to be used, an initial tension is imparted to the drill cable by tightening the dead end of the cable around the bull wheel. When the cable has been so initially tensioned, the yoke 60 is then clamped thereto with the hammer members of the yoke in contact with the anvils 54. Following this operation, a tug line 83 is clamped to the yoke. This may be accomplished by providing the bar portion of the yoke with a second clamping lever 84, the latter being located on the opposite side of the yoke bar 61 as regards the lever 62. The lever 84 is virtually a duplicate of the lever 62, and has one end thereof pivoted as at 85 to the yoke and its opposite or outer end received in a bail 86. A set screw 87 is carried by this bail, and, when tightened, the inner end of the set screw 87 engages with the complemental end of the yoke bar 61 in order to bring the lever 84 into clamping engagement with the lower end of the tug line 83.

The tug line passes upwardly from the yoke through the derrick 81, and may be trained over the crown block of the latter and thence brought downwardly for passage around a guide sheave 88, shown, in this instance, as being mounted on one of the frame legs of the derrick 81. From the guide sheave 88, the tug line is passed to the wrist pin 32 of the free motion crank assembly 33. It will be seen that when the crank assembly rotates, the tug line will serve to elevate the yoke and hammer members of the jar, as well as portions of the drill cable 59 below the yoke and the string of tools carried by the lower end of the drill cable and positioned in the well bore. When the tug line is so used, that part of the drill cable 59 above the yoke may be slackened, as shown in Fig. 10, by the operation of the bull wheel 82. However, the initial tension in the length of the drill cable below the yoke is maintained, and the additional stretching of the drill cable to elevate the hammer members from the anvils 54 is performed by the operation of the tug line. When the crank 40 of the assembly 33 is released for rapid turning movement under the pull of the tug line and the appliances suspended therefrom, the hammer members descend upon the anvils 54, abruptly checking the contraction of the drill cable 59, and imparting forces to the drill cable adapted for the release of the lodged tools carried thereby.

A further variation of the invention has been illustrated in Figs. 17 to 20 inclusive, wherein the jar apparatus has been disclosed as being of the fluid-actuated type, rather than the strictly mechanical types previously set forth.

Figure 17:
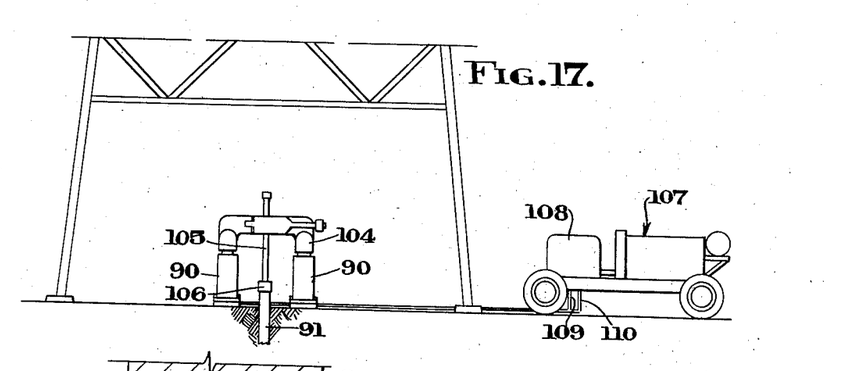
Fig. 17 is a diagrammatic elevational view showing fluid-actuated jarring apparatus.
Figure 18:
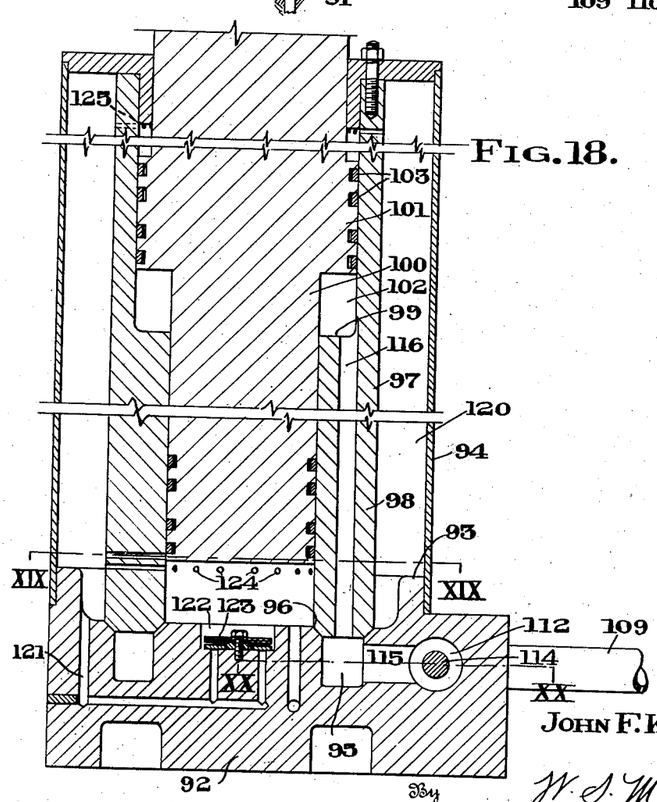
Fig. 18 is a vertical sectional view taken through one of the cylinders of the fluid-actuated apparatus, disclosing its internal structure.

As shown in these figures, the fluid-actuated jar comprises a pair of cylinders indicated at 90, the same being mounted on the ground, or derrick floor, in equally spaced relation on opposite sides of the well bore 91. Each of the cylinders comprises a base casting 92, having an upstanding annular flange 93 around which is positioned and suitably secured the lower end of a cylindrical casing 94. Each base casting is further formed with an annular passage 95 and arranged above this passage and seated on the beveled walls 96 thereof is a cylinder member 97. The lower portion of the cylinder member has relatively thickened walls 98, which terminate in an annular shoulder 99, above which shoulder the internal diameter of the cylinder member is greater than its diameter below the shoulder.

Positioned for sliding movement in each of the cylinder members 97 is a piston 100. Intermediately of its length, the piston is formed with a head 101, which is slidably received in the chamber 102, formed by enlarging the internal diameter of the cylinder to the extent indicated by the shoulder 99. The head 101 may be provided with the usual piston rings 103. Below the head 101, each piston is reduced in diameter to correspond with the internal diameter of the lower portions of the cylinder 97, as produced by the thickened walls 98. The upper ends of the pistons 100 slidably project through the tops of the cylinders 90 and are connected with a clamping yoke 104. In Fig. 17, the yoke 104 has been shown as secured to the upper end 105 of a string of well tubing, the latter extending, as usual, into the well bore and axially of the well casing, indicated at 106. When so connected with the tubing 105, the apparatus may be used in liberating a lodged packer within the well bore. However, if desired, the yoke 104 may be joined with a drill cable, as in the previously described forms of the invention.

To effect the elevation of the pistons 100 in the cylinder members 97 in order to apply tensioning forces to the tubing 105, or any associated drill cable, I may employ a motor driven tractor vehicle of the type indicated at 107, utilizing the engine of this vehicle for operating a fluid pump or compressor 108. From the fluid inlet and outlet of the pump or compressor 108, there may be conveniently extended pipe or hose lines 109, 110, the former of which being employed to conduct a fluid under positive flow to the fluid inlets 111 of the cylinders 90 and the latter to return such fluid to the pump or compressor. As a practical matter, I have found it convenient to use oil as the motivating fluid.

Figure 20:
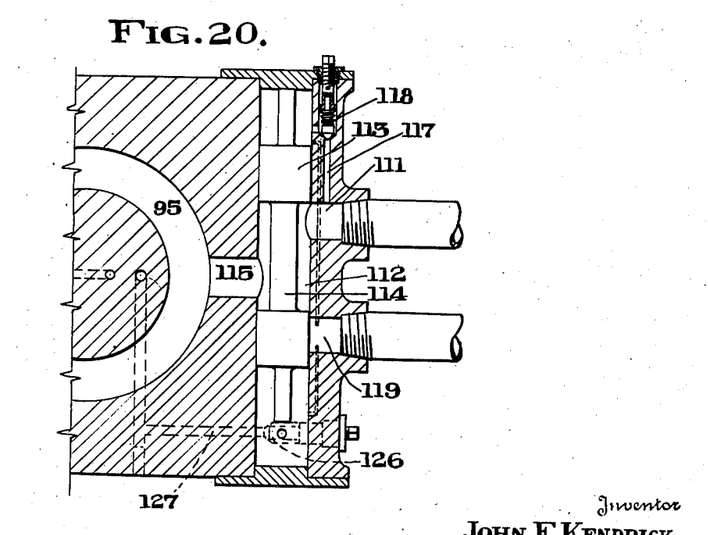
Fig. 20 is a similar view on the line XX—XX of Fig. 18.

To control the introduction of the motivating fluid into said cylinders and its discharge therefrom, the base 92 of each cylinder is provided with a valve chamber 112. Slidably positioned in each of these chambers is a balanced type spool valve 113. With the valve of each cylinder positioned as shown in Fig. 20, oil or other fluid entering the bottom of the cylinder through the pipe line 109 and the inlet 111, flows around the reduced central portion 114 of the valve and passes by way of a port 115 into the circular passage 95, thence passing upwardly through one or more vertical passages 116, provided in the thickened walls 98 of each of the cylinder members 97. Fluid pressures of the order of several hundreds of pounds per square inch may thus be applied to the under surfaces of the piston heads 101, causing the elevation of said pistons, the yoke 104 carried thereby and the stretching or tensioning of the well tubing or drill cables connected therewith.

Following predetermined elevation of the pistons and the consequent tensioning of the associated well bore devices, the operating position of the spool valve 113 in each cylinder is reversed to permit of the rapid descent of the pistons and to sharply arrest such descent while the devices gripped by the yoke 104 are yet under tension. Conveniently, this result may be accomplished by the provision of a bypass port 117 which extends from the fluid inlet 111 to one end of the valve chamber 112. Normally closing the port 117 is an adjustable spring-loaded valve 118 which may be set to open the port 117 when the fluid pressures within the inlet 111 reach a predetermined volume. When the port 117 is open, fluid pressures are developed on one end of the valve 113, causing the latter to shift its position in the chamber 112, thereby closing the inlet 111 and uncovering the outlet opening 119 which communicates with the fluid return line 110. Because of the weights imposed thereon by the well bore appliances suspended from the yoke 104, the pistons move rapidly downwardly in the cylinder members 97, fluid being displaced from beneath the heads 101 and being discharged through the vertical passages 116, the annular passage 95, port 115, valve chamber 112 and thence through outlet opening 119 to the return line 110.

In operation, the chamber or reservoir 120, which is formed in each of the cylinders 90 between the casing 94 thereof and the cylinder member 97, is filled with the motivating fluid. The base 92 of each cylinder is provided with restricted fluid conducting passages 121 which lead from the bottom of the reservoir 120, as shown in Fig. 18, to a valve pocket 122 disposed below and in registration with the piston 100. A disk valve assembly 123 is employed to permit of fluid flow from the reservoir 120 through the passages 121 and into the bottom of the cylinder member 97 when the associated piston 100 moves upwardly, breaking any vacuum which may exist in the bottom of the cylinder structure and facilitating the upward movement of the piston. Upon the descent of the piston, however, the disk valve assembly closes, so that the oil or other fluid in the bottom of the cylinder structure may escape into the reservoir only by way of the circularly arranged rows of restricted apertures shown at 124.

These apertures are formed in the bottom portions of the cylinder members 97 and any desired number of these vertically arranged rows of apertures may be used. As the piston descends, these rows of apertures are successively covered by the piston to provide for the desired impact action of the pistons on the operating fluid and stationary parts of the apparatus. A row of spaced ports 125 may be provided in the upper portions of the cylinder members 97 above the enlarged head 101 of each of the pistons 100, to provide for the flow of the operating fluid between the reservoir 120 and the interior of the cylinder members 97 above the heads 101.

Figure 19:
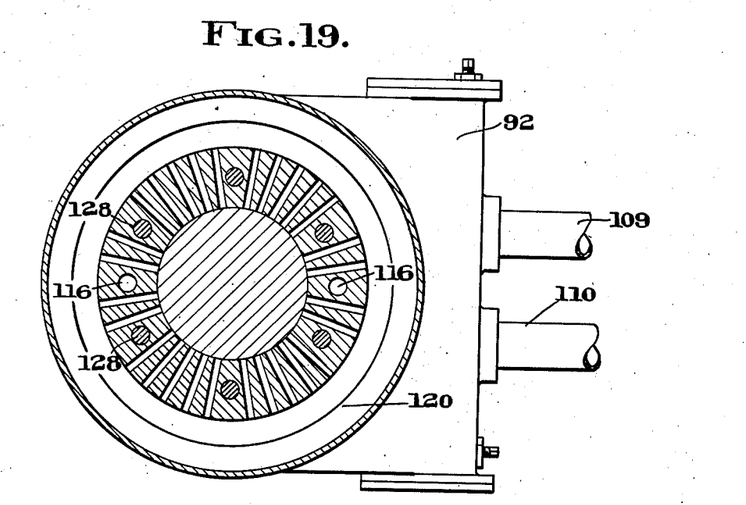
Fig. 19 is a horizontal sectional view on the plane indicated by the line XIX—XIX of Fig. 18.

To automatically reverse the positions of the valves 113 following the desired descent of the pistons 100 and again to introduce fluid under pressure into the cylinder structures to elevate the pistons, each of the base castings 92 is provided with a second spring-loaded valve 126 of the same type as indicated at 118. Each of the valves 126 is employed to govern the flow of the operating fluid from the bottom of the cylinder member 97 through a passage 127 formed in the casting 92 and leading to the valve chamber 112. Each valve 126 is operative so that when predetermined fluid pressures are applied thereto, the valve will open, allowing the fluid to enter one end of the chamber 112 and exert force on the spool valve 113 to shift the latter back to the position disclosed in Fig. 20. By these means, the pistons 100 are automatically pulsated to produce the desired jarring action on the well bore appliances connected therewith. The stud bolts, shown at 128 in Fig. 19, are employed in uniting the cylinder members 97 with their associated base castings 92.

The present invention thus provides a jar apparatus which is adapted to be operated from the ground surface at the top of the well bore in which the lodged appliances are located. The apparatus may be quickly applied to an associated drill cable or other elongated well appliance and actuated with the use of the customary equipment of a well rig. The use of the apparatus results in marked savings both in time and cost with respect to previously used methods and appliances, and has, further, the advantage of convenience in application and control because of its accessible location above the well opening.

What is claimed is:

1. Apparatus for releasing stuck well-drilling tools suspended from a cable and disposed in a well bore, comprising an impact-imparting means carried by such a cable at the top of the well bore, means for stretching the cable and releasing the same for sudden contraction, and impact-receiving means supported independently of said cable, said latter means being positioned to arrest movement of the impact-imparting means prior to complete contraction of the cable when the latter is released from the stretching forces applied thereto.

2. Apparatus for releasing devices lodged in a well bore, comprising a hammer movable in unison with said devices at the top of the well bore, means for stretching the devices and suddenly releasing the same for contraction, and a ground-supported anvil engageable with said hammer when said devices have been partially contracted following release of the stretching forces.

3. In apparatus for effecting the release of lodged well-drilling tools suspended from an operating cable and disposed in a well bore, impact-imparting means fixed to said cable at the top of the well bore, means for applying tensioning forces to said cable to elongate the same, cooperative means for effecting a quick release of said tensioning forces applied to the cable and cause the sudden contraction of the cable, and a ground-carried impact-receiving instrumentality for arresting the movement of said impact-imparting means prior to complete contraction of said cable in reacting to the release of said tensioning forces.

4. The method of releasing a cable-actuated drilling tool lodged against normal movement in a well bore, comprising applying to the actuating cable of such a drill tensioning forces to cause an elongation of the cable, suddenly releasing said tensioning forces to effect a sharp reacting contraction of the cable, and mechanically arresting the contraction energy of the cable prior to complete contraction thereof, whereby to impart forces to the cable adapted for the release of the drill tool.

5. The method of releasing cable-actuated drill tools lodged against normal movement in a well bore, comprising applying to the actuating cable of such drill tools from the top of the well bore initial tensioning forces, securing to the initially tensioning cable for movement in unison therewith an impact-imparting instrumentality, applying further tensioning forces to the cable to additionally stretch and elongate the same, suddenly releasing the cable from said tensioning forces to effect its sharp contraction, and interrupting the contraction of the cable prior to complete expenditure of the contracting energy thereof by causing said impact-imparting member to engage with a ground-carried impact-receiving member.

6. The method of releasing a trapped cable-actuated well-drilling tool positioned in a well bore, comprising tensioning the cable to elongate the same, suddenly releasing the tension-producing forces to effect sharp contraction of the cable, and abruptly arresting the contraction of the cable prior to final expenditure of its contracting energy to impart releasing forces to the trapped drilling tool carried by the lower end of the cable in the well bore.

7. A surface jar for releasing trapped well-drilling tools, comprising a ground-supported anvil, a hammer member normally engaged with said anvil and movable in unison with an associated derrick mounted drill cable, means for stretching the drill cable to space said hammer member from said anvil, and means for effecting a sudden release of the cable stretching means to bring said hammer member, upon the contraction of the cable, into forcible impact-imparting engagement with the anvil.

8. Apparatus for releasing devices lodged against normal movement in well bores, comprising impact-delivering mechanism located above a well bore, means for securing said mechanism to an elongated tensionable member disposed in the well bore so that said means moves in unison with said member, means for placing said member under tension to elastically elongate the same, an impact-receiving element mounted adjacent to the upper end of the well bore, and means for quickly releasing said member following elongation thereof to cause its partial contraction, whereby to bring said mechanism into impact delivering coaction with said element prior to complete expenditure of the tensioning energy previously applied thereto.

9. The method of releasing devices lodged against normal movement in subterranean well bores comprising: subjecting an elongated tensionable member disposed in a well bore to forces producing elongation thereof, quickly releasing said member from said tensioning forces to cause its sharp contraction, and abruptly arresting the contraction of said member prior to full expenditure of its contracting energy to impart thereto longitudinally directed dislodging forces which travel the length of said member and said bore to the affected regions in the well bore.

10. The method of releasing devices lodged against normal movement in subterranean well bores comprising: subjecting an elongated tensionable member disposed in a well bore to forces producing elongation thereof, quickly releasing said member from said tensioning forces to cause its sharp contraction, and abruptly arresting the contraction of said member prior to full expenditure of its contracting energy to impart thereto longitudinally directed dislodging forces which travel the length of said member and said bore to the affected regions in the well bore, said tensioning forces being applied to said member from the top of the well bore.

11. Apparatus for releasing devices lodged against normal movement in a well bore, comprising a pair of impact-imparting devices, means for detachably securing said devices to an elongated tensionable member disposed in the well bore for movement in unison therewith, said devices being disposed when fixed to said member above the well bore, means for stretching said member by applying tensioning forces thereto and following predetermined stretching suddenly releasing the same for contraction, and ground-supported impact-receiving elements engageable with said devices when said member has been partially contracted following release of the stretching forces.

12. Apparatus for releasing devices lodged against normal withdrawal movement in well bores, comprising impact-delivering mechanism located above a well bore, means for securing said mechanism to an elongated tensionable member disposed in the well bore, whereby to cause said delivering mechanism to move in unison with said member, fluid actuated means cooperative with said delivering mechanism for placing said member under tension to elastically elongate the same, and valve means for governing the operation of said fluid actuated means to suddenly release the tension on said elongated member to cause rapid contraction thereof.

13. Apparatus for releasing devices lodged in a well bore comprising a cylinder disposed above the well bore, a piston slidably mounted in said cylinder and projecting beyond one end thereof, means for detachably clamping the projecting end of said piston to an elongated tensionable member disposed in the well bore, means for admitting a fluid under pressure into said cylinder for effecting movement of said piston and thereby apply tensioning forces to said elongated member, means for effecting a rapid discharge of fluid from said cylinder to provide for sharp contraction of said elongated member following predetermined tensioning thereof, and means for abruptly terminating the discharge of fluid from said cylinder prior to full contraction of the elongated member in response to the release of said tensioning forces to sharply arrest the movement of said piston and thereby apply dislodging forces to said elongated member.

14. A surface jar for releasing trapped well bore appliances comprising a cylinder, a piston slidably mounted in said cylinder and projecting through one end thereof, clamping means carried by the projecting end of said piston for connecting the latter with an elongated tensionable appliance extending longitudinally into the well bore, means for supplying a fluid under pressure to said cylinder to produce movement of said piston effecting the tensioning and elongation of said appliance, said means including a pressure balanced control valve, and means governed by the fluid pressures established within said cylinder for alternately moving said valve between fluid admitting and discharge positions.

15. Shock-producing apparatus for releasing trapped well bore appliances, comprising a percussion member adapted for detachable securement to an elongated tensionable member extending into the well bore, a rotatable power driven crank, a free-motion element positively rotatable with said crank during one part of its orbit of movement and independently rotatable with respect to said crank through the remaining portion of its orbit of rotation, and flexible means cooperative with said free-motion element and said elongated member to place the latter under tension and actuate said percussion member.

16. Shock-producing apparatus for use in releasing trapped well bore appliances, comprising a movable percussion device, means for detachably clamping said device to the actuating cable of a well drilling tool at the top of a well bore in which the cable is situated, a ground-supported impact-receiving appliance cooperative with said percussion device, means for placing said cable under initial tension, means for applying additional tension to said cable to elongate the same and space said percussion device from the impact-receiving appliance, and means for suddenly releasing the cable from such additionally applied tensioning forces to cause said percussion device upon the contraction of the cable to forcibly engage the impact-receiving appliance, said latter means embodying a rotatable power driven crank, an element positively rotatable with said crank through one portion of its full orbit of rotation and independently rotatable with respect to said crank through the remaining portion of its orbit of rotation, and a flexible connection between said element and said cable.

17. Jar apparatus for effecting the release of lodged well drilling tools suspended from an operating cable and disposed in a well bore, impact-imparting means detachably secured to said cable at the top of the well bore, means for applying tensioning forces to said cable to elongate the same, cooperative means for effecting a quick release of said tensioning forces applied to said cable to cause its sudden contraction, an impact-receiving instrumentality for arresting the movement of said impact-imparting means prior to complete contraction of said cable in reacting to the release of said tensioning forces, and a shock-absorbing base for effecting the support of said impact-receiving instrumentality.

18. A surface jar for effecting the release of lodged well-drilling tools suspended from the operating cable and disposed in a well bore, a pair of impact-producing members, a yoke uniting said members, clamping devices carried by said yoke for detachably securing the latter to said cable for movement in unison therewith, impact-receiving appliances aligned with said impact-producing members, means for applying tensioning forces to said cable to elongate the same, and cooperative means for effecting a quick release of said tensioning forces to cause the sudden contraction of said cable and the rotatable engagement of the impact-producing members with said impact-receiving appliances.

JOHN F. KENDRICK.